Patented June 28, 1932

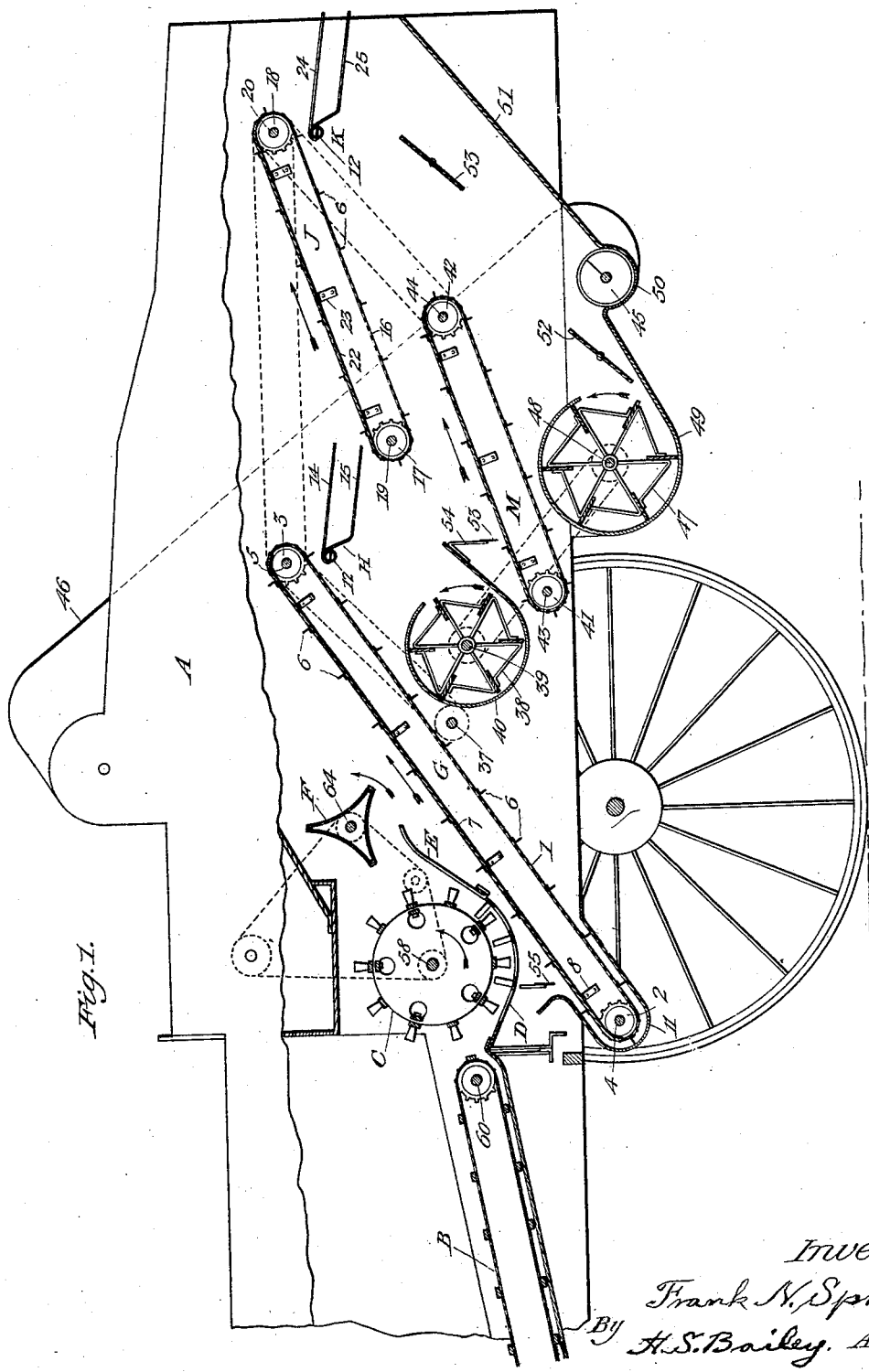

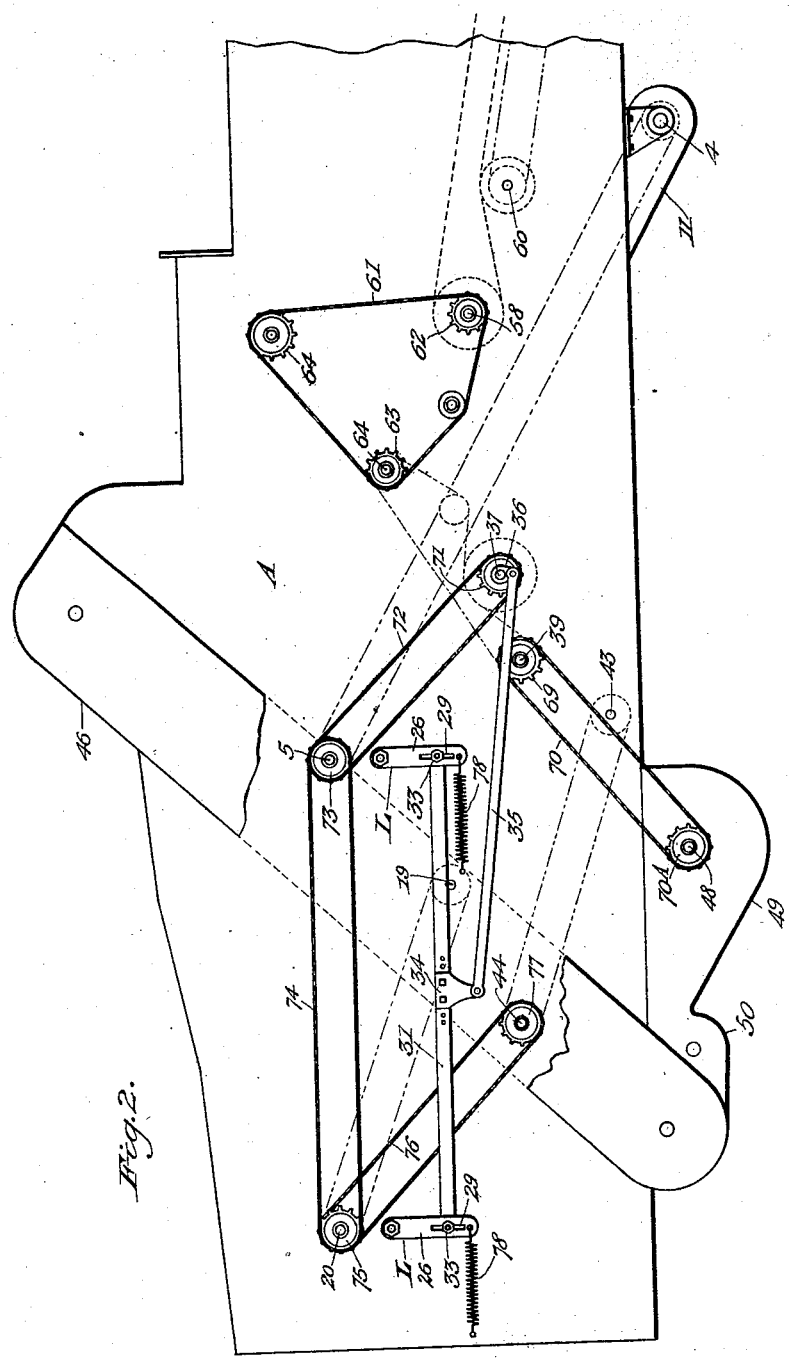

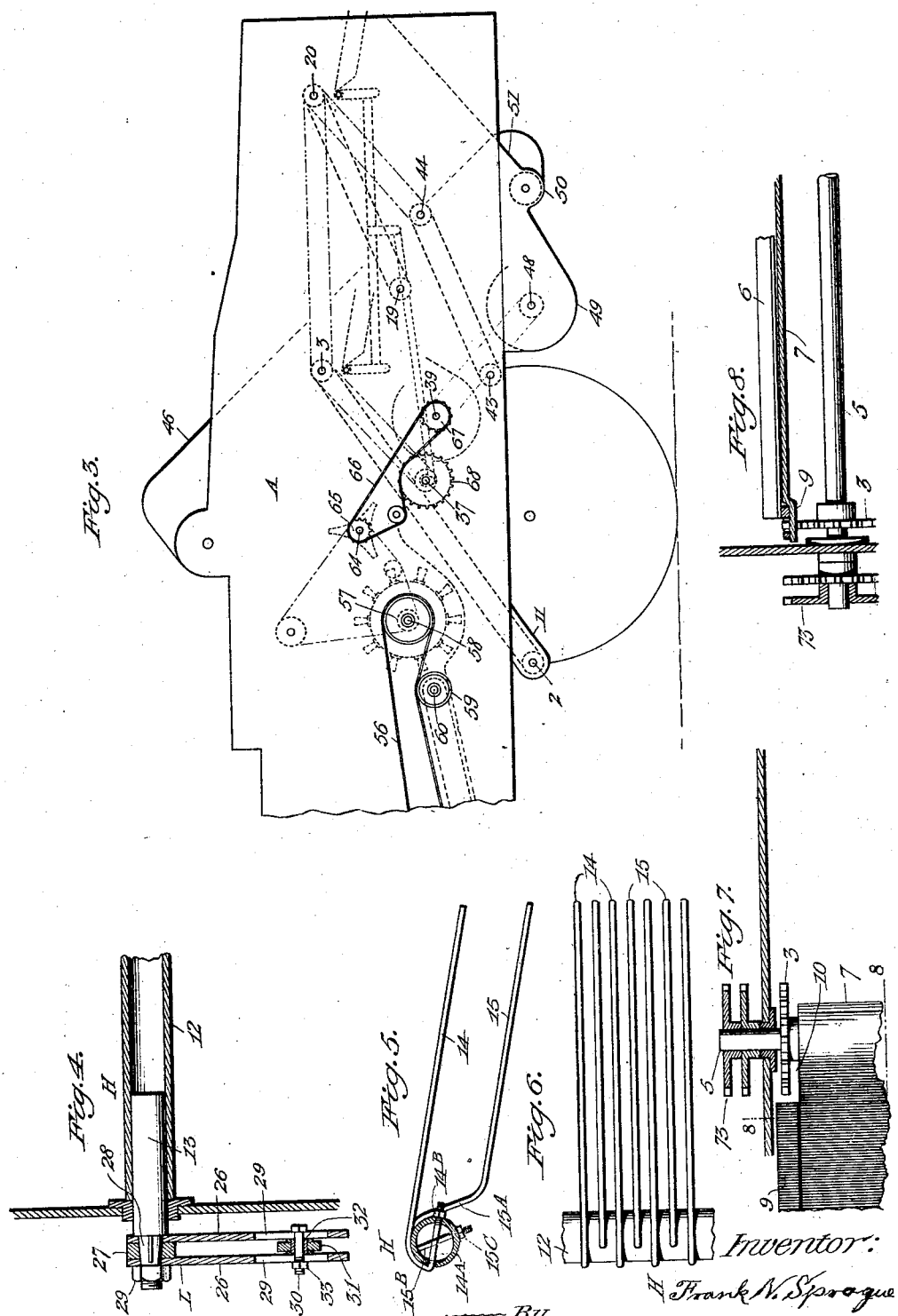

1,864,772

UNITED STATES PATENT OFFICE

FRANK N. SPRAGUE, OF HOLYOKE, COLORADO

GRAIN SEPARATOR FOR THRESHING MACHINES OR COMBINES

Application filed November 4, 1930. Serial No. 493,320.

My invention relates to improvements in grain separators for threshing machines or combines.

The main object of the invention is to dispense with the usual straw racks which carry the straw through the machine, and to substitute therefor mechanism comprising an endless conveyor for receiving the straw from the usual threshing cylinder and concave; a second endless conveyor and shaking means interposed between the first and second conveyors; the straw being subjected to an air blast as it passes from the shaking means to the second conveyor, whereby the chaff is loosened up and prevented from matting, thus permitting the cleaned grain to drop down upon a third endless conveyor, whence it is discharged into an auger or screw conveyor; the straw discharging from the second conveyor being subjected to a shaking action and an air blast whereby the chaff and other light objects are driven off and any grain carried by the straw is released and drops into the said auger, which conveys the grain to the usual recleaning mechanism.

Further, to provide grain separating mechanism for threshing machines and combines which effects a uniform passage of the straw through the machine; which prevents clogging of the straw and chaff and in which there are no heavy vibrating parts to rack the machine.

These objects are accomplished by the mechanism illustrated in the accompanying drawings in which:

Fig. 1 is a vertical longitudinal sectional view through a threshing machine equipped with the improved grain separating mechanism;

Fig. 2 is a view of the right hand side of the machine showing more particularly, the mechanism for operating the straw shakers;

Fig. 3 is a view on a slightly reduced scale of the left side of the machine;

Fig. 4 is a longitudinal sectional view through a portion of one of straw-shaker operating shafts and the rock arm therefor;

Fig. 5 is a transverse sectional view through the straw-shaker operating shaft, showing the manner of securing the fingers or tines thereto;

Fig. 6 is a plan view of a portion of the straw shaker shown in Fig. 5;

Fig. 7 is a fragmental plan view of any one of the endless conveyors and

Fig. 8 is a sectional view on the line 8—8 of Fig. 7.

In threshing machines of the usual type the straw is carried forward by a series of racks which are connected at their front or receiving ends to rock arms and at their forward ends to a crank shaft by which they are given a combined vertical and horizontal movement which acts to kick the straw through the machine. These racks not only produce a violent shaking or vibratory action which tends to rack the machine; but they fail to effect a uniform passage of the straw and also permit clogging of the straw and chaff, with a consequent imperfect separation of the grain from the straw.

The improved grain separating mechanism which is embodied in the present application is designed to overcome the objectionable features in a manner which will hereinafter to particularly set forth.

Referring to the accompanying drawings: The letter A refers to the body of a threshing machine or combine which may be of the usual construction; B, the endless feed conveyor which carries the straw to the threshing cylinder C and the cooperating concave D, which terminates in a series of fingers E, and F refers to the rotary beater, these parts being of a type in general use.

An upwardly and rearwardly inclined endless conveyor G is positioned below the concave D and beater F and extends from a point forward of the axis of the threshing cylinder to a point somewhat beyond the beater. This conveyor comprises endless parallel sprocket chains 1, which are carried by sprocket wheels 2 and 3, mounted on shafts 4 and 5 respectively, which are suitably mounted in bearings on the frame of the machine. The chains are connected by light angle bars 6 and the angle bars of the upper laps of the chains rest upon and are supported by a table or platform 7 which extends the width of the machine and is supported upon cross bars 8, the ends of which are bent at right angles and secured to the sides of the body of the machine. The platform 7 is provided with off-set side edge portions 9, as shown in Fig. 8, upon which the chains rest, thus permitting the angle bars or slats 6 which connect the chains to rest upon the table 7, and the off set portions are cut away near the ends of the table, as shown at 10 in Fig. 7 so as to provide space for the sprocket wheels 2 and 3. A boot 11 extends around the lower end portion of the conveyor and is adapted to catch any grain that might otherwise slide off from the conveyor, as will be hereinafter shown. The conveyor catches any grain and chaff that passes through the concave and between the fingers E, together with the straw as it leaves the beater F and carries in continuously and discharges it on to the first of the improved straw shakers H, which is arranged and constructed in the following manner:

A hollow shaft 12 extends across the machine slightly below the discharge end of the conveyor G and the ends of this shaft are provided with trunnions 13, which are journaled in suitable bearings in the sides of the machine. The shaft 12 is provided with two sets of tines or fingers 14 and 15, the set 15 being below the set 14. The rear ends of the fingers 14 are bent over and under to provide short portions 14—A, which are passed through alined holes in the shaft 12, their ends being threaded to receive locking nuts 14—B. The rear end portions of the fingers 15 are bent up at an angle to form portions 15—A and then over and around to form short portions 15—B which are passed through alined holes in the shaft, their ends being threaded to receive nuts 15—C. The fingers of the straw shaker H extend rearwardly and at a downward inclination, and the shaft 12 is a rock shaft and is given a rapid rocking motion in a manner to be later described, thereby to impart a rapid swinging motion to the fingers 14—15, by which the straw as it passes over the fingers is violently shaken and the major portion of the grain carried in the straw is separated therefrom and drops down, as will later be more fully set forth. From the shaker H the straw discharges on to a second endless conveyor J, which is in all respects similar to the conveyor G and comprises endless sprocket chains 16 carried by sprocket wheels 17 and 18 mounted respectively on shafts 19 and 20, which are journaled in the sides of the machine; the chains being connected by light angle bars 6 which ride upon a table or platform 22 supported by cross bars 23. From the conveyor J the straw discharges on to a second shaker K which is identical in construction with the shaker H and comprises a hollow shaft 12—A provided with upper and lower sets of fingers 24 and 25 which are secured to the shaft in the manner described in connection with the fingers 14 and 15 of the shaker H, the shaft being also provided with trunnions which are journaled in the sides of the machine. The rock shafts 12 and 12—A are operated in the following manner:

The trunnion 13 in one end of each shaft, preferably on the right side of the machine extends beyond the side of the machine and is provided with a depending lever arm L, which is made up of a pair of spaced parallel arms 26, the upper ends of which are separated by a spacing block 27, these ends and the block being apertured and secured upon a tapered portion 28 of the spindle by a key and a nut 29. The lower portions of the members 26 of each of the arms L are provided with longitudinal slots 29, through which are passed bolts 30 which also extend through the ends of a rod 31, which connects the two lever arms L. A spacing sleeve 32 surrounds each bolt 30 between the arm members 26 to define the space between the members 26 and the lower portions of the members 26 and the bolts are provided with clamping nuts 33. Thus the bolts can be adjusted in the slots 29 and held against movement by clamping the members 26 against the ends of the said sleeves 32. A short depending arm 34 adjustably secured to the connecting arm 31 and the lower end of this arm is connected by a pitman rod 35 with a crank 36 on the end of a shaft 37 which extends across the machine and through and beyond the opposite side thereof, and when the shaft 37 is rotated, in a manner to be presently described, the crank 36 and pitman rod 35 impart a rapid reciprocating movement to the connecting rod 31 by which the lever arms L are oscillated, thereby rocking the straw shakers H and K.

A rotary fan 38 of the usual type is rigidly mounted on a shaft 39 which extends across the machine and is mounted in the sides thereof. The fan is housed in a casing 40 having an opening which is adapted to direct an air blast up through the straw shaker H as the straw passes from the shaker on to the conveyor J, thereby loosening up the chaff and preventing it from matting, thus permitting the cleaned grain to separate from the straw and drop down through the fingers of the shaker and any straw or trash passing through the upper set of fingers will be caught by the lower fingers and deposited on the conveyor J and if desired, the lower fingers may be closer together than the upper fingers. The grain falling through the shaker H drops upon an endless conveyor M, similar in all respects to the conveyors G and J and the sprocket wheels 41 and 42 of this conveyor are mounted on shafts 43 and 44 which are journaled in the sides of the machine. The conveyor M extends at an upward and rearward inclination from a point below the fan casing 40 to a point beyond and below the front end of the conveyor J, and the grain falling on the conveyor M is discharged into a horizontally disposed screw conveyor or auger 45, which extends across the machine and delivers the grain to an endless conveyor—not shown—but which is housed in a casing 46 and this conveyor delivers the grain to a recleaning mechanism in the upper part of the machine, which is not shown, as it forms no part of the present invention and is of a type in common use in threshing machines and combines.

A fan 47 is rigidly mounted on a shaft 48 below the conveyor M and is housed in a casing 49, the bottom portion of which extends to and forms a part of a trough or chute 50 which partially surrounds the auger 45 and extends from the trough 50 in the form of an upwardly inclined slideway 51 to the rear end of the machine. It will thus be seen that the grain and any chaff or light trash discharged by the conveyor M is subjected to an air blast from the fan 47 and the chaff and other light objects will be driven out through the rear end of the machine, and the clean grain will drop into the auger 45. The inclination of the slideway 51 will direct the air from the fan 47 up through the straw shaker K, thereby carrying off any chaff remaining in the straw as it discharges from the conveyor J on to the said shaker, and any grain remaining in the straw will drop upon the incline 51 and slide into the auger 45. Deflectors 52 and 53 are pivotally mounted in the machine between the fan 47 and the shaker K; these deflectors being adapted to effectively direct the air blast with respect to the discharge from the conveyor M and the shaker K.

A flap 53 of any suitable flexible material extends across the machine above and close to the forward portion of the conveyor M and is secured to a suitable support 54. This flap prevents any material falling from the shaker H to bounce or slide off the said conveyor. A similar flap 55 performs the same function in connection with the conveyor G. The conveyors, straw shakers and fans are operated in the following manner:

The threshing cylinder C is operated by a belt 56 driven by the engine—not shown—on the front end of the machine, the belt passing around a pulley 57 on the shaft 58 which carries the said threshing cylinder and the under side of this belt engages a pulley 59 on a shaft 60 of the feed conveyor B. A chain 61 engages a sprocket wheel 62 on the shaft 58 of the threshing cylinder, a sprocket wheel 63 on the shaft 64 of the beater F, and a sprocket wheel 64 on the fan shaft of the recleaner fan—not shown. The other end of the beater shaft carries a sprocket wheel 65 and a chain 66 engages this sprocket wheel, and a sprocket wheel 67 on the end of the shaft 39 of the fan 38, the under lap of the chain passing over a sprocket wheel 68 on the shaft 37, which operates the pitman rod 35. The opposite end of the fan shaft 39 carries a sprocket wheel 69 and a chain 70 connects this wheel and a sprocket wheel 70—A on the shaft 48 of the fan 47. The opposite end of the shaft 37 from the wheel 68 carries a sprocket wheel 71 and a chain 72 connects this wheel and a wheel 73 on the shaft 5 of the conveyor G. A chain 74 connects a second sprocket wheel on the shaft 5 with a sprocket wheel 75 on the shaft 20 of the conveyor J, and a second sprocket wheel on the shaft 20 is connected by a chain 76 with a sprocket wheel 77 on the shaft 44 of the conveyor M, thus completing the operating connection between the various elements of the grain separating mechanism.

In order to relieve the tension of the shafts of the straw shakers H and K caused by the weight of the shaker fingers, a coil spring 78 is connected at one end to the lower end of each lever arm L and the other end of the spring is connected to a pin or hook on the side of the machine. These springs are under tension and also assist in lifting the fingers. By adjusting the arm 34 on the connecting rod 31, the angle of the shaker fingers can be changed to stand at a greater or lesser angle to the horizontal; and by the vertical adjustment of the arm 31 in the slots 29 of the rock arms L, the length of throw of the arm 31 may be increased or diminished, thus either increasing or diminishing the force of throw of the straw by the fingers without changing the speed of the mechanism.

In operation, the straw passes from the feed conveyor B to the threshing cylinder and is drawn in between the cylinder and concave D and passes thence under the beater F and on to the endless conveyor G and any grain or chaff falling through the concave and teeth E is also dropped upon the conveyor G. From the conveyor G the straw discharges upon the shaker H and at the same time is subjected to an air blast from the fan 38 by which the chaff is loosened and clogging of the straw prevented, and the clean grain drops down upon the conveyor M and is discharged into the auger 45, an air blast from the fan 47 carrying off all chaff and other light materials. The straw from the shaker H falls upon the conveyor J and discharges therefrom upon the shaker K and any remaining chaff and material in the straw is driven off by the blast from the fan 47 and any remaining grain carried by the straw drops down on the incline 51 and slides down into the auger 45.

Having described my invention, what I claim as new and desire to secure by Letters Patent, is:

1. In mechanism of the character described, a straw shaker comprising a shaft having an upper and lower row of spaced fingers which are bent over and then under at one end to provide short portions which are passed through holes in said shaft, the ends of said short portions being threaded and provided nuts, the lower fingers being bent at their connection with the shaft to form depending portions, and then outward parallel with the upper fingers.

2. In mechanism of the character described, a straw shaker comprising a hollow shaft, provided with two sets of holes and provided at its ends with trunnions; an upper and lower row of fingers which are bent over and then under at one end to provide short portions which are passed through the respective sets of holes, the ends of said short portions being threaded to receive securing nuts, the lower fingers being bent down at their connection with the shaft to form depending portions and then outward parallel with the upper fingers.

3. In a threshing machine, the combination with shafts mounted in the sides thereof, and straw shaking fingers secured in said shafts; of means for rocking said shafts, comprising a rock arm on one end of each shaft, said arms comprising parallel spaced sections rigidly secured at one end to said shafts, and provided with longitudinal slots; bolts extending through the slots of each pair of arm sections and spacing sleeves surrounding said bolts, a connecting rod mounted at each end on one of said sleeves, said bolts being adjustable in said slots, a power driven crank on said machine; a pitman rod connected at one end to said crank and having a horizontally adjustable connection at its opposite end with said connecting rod and coil contraction springs connected to the said rock arms and to the side of the machine to relieve the tension on the shafts, due to the weight of the said fingers.

In testimony whereof, I affix my signature.

FRANK N. SPRAGUE.